(12) United States Patent
McGee et al.

(10) Patent No.: US 11,035,295 B2
(45) Date of Patent: Jun. 15, 2021

(54) ENGINE NACELLE HEAT EXCHANGER

(71) Applicant: Lockheed Martin Corporation, Bethesda, MD (US)

(72) Inventors: Mark G. McGee, Benbrook, TX (US); Robert Borovsky, Fort Worth, TX (US); Troy Don Brunson, Benbrook, TX (US); Lori Kay Jackson, Weatherford, TX (US); Devin A. Stacey, Fort Worth, TX (US); Carey F. Cox, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 248 days.

(21) Appl. No.: 15/956,173

(22) Filed: Apr. 18, 2018

(65) Prior Publication Data
US 2019/0323429 A1  Oct. 24, 2019

(51) Int. Cl.
*F02C 7/18* (2006.01)
*B64D 33/02* (2006.01)
*B64D 33/08* (2006.01)
*F01D 25/24* (2006.01)
*F02C 7/25* (2006.01)
*F02C 7/28* (2006.01)

(52) U.S. Cl.
CPC ............. *F02C 7/18* (2013.01); *B64D 33/02* (2013.01); *B64D 33/08* (2013.01); *F01D 25/24* (2013.01); *F02C 7/25* (2013.01); *F02C 7/28* (2013.01); *B64D 2033/024* (2013.01); *F05B 2240/14* (2013.01); *F05B 2260/20* (2013.01); *F05D 2240/55* (2013.01)

(58) Field of Classification Search
CPC .......... F01D 11/05; F01D 25/08; F01D 25/12; F01D 25/14; F01D 25/24; F02C 7/04; F02C 7/18; F02C 7/25; F02C 7/28; B64D 33/08; B64D 2033/024
See application file for complete search history.

(56) References Cited

U.S. PATENT DOCUMENTS

| | | | |
|---|---|---|---|
| 4,474,344 A | 10/1984 | Bennett | |
| 5,806,793 A * | 9/1998 | Brassier | B64D 33/08 244/117 A |
| 7,600,714 B2 | 10/2009 | Sheoran et al. | |
| 7,665,310 B2 | 2/2010 | Laborie | |
| 7,832,684 B2 | 11/2010 | Scherer et al. | |
| 8,640,478 B2 | 2/2014 | Kim et al. | |
| 9,108,737 B2 | 8/2015 | Zysman | |

(Continued)

FOREIGN PATENT DOCUMENTS

DE  102008027275 A1 *  1/2010  ............... F02C 7/04

*Primary Examiner* — Arun Goyal
(74) *Attorney, Agent, or Firm* — Baker Botts L.L.P.

(57) ABSTRACT

A nacelle for an engine includes an exterior housing a least partially surrounding the engine. The nacelle further includes a front portion proximate an engine face of the engine. The front portion of the nacelle defines an opening into an interior of the nacelle. The nacelle further includes a seal disposed proximate the opening. The seal is configured to selectively allow air into the interior of the nacelle. The nacelle further includes a heat exchanger disposed within the interior of the nacelle. The heat exchanger is configured to exchange heat between a fluid flowing within the heat exchanger and air at the interior of the nacelle.

11 Claims, 5 Drawing Sheets

(56) References Cited

U.S. PATENT DOCUMENTS

| | | | |
|---|---|---|---|
| 9,422,062 B2 | 8/2016 | Alvarez et al. | |
| 9,574,518 B2 | 2/2017 | Moore et al. | |
| 2005/0279103 A1* | 12/2005 | Bowers | F01D 25/12 60/782 |
| 2006/0117734 A1* | 6/2006 | Larkin | F01D 25/12 60/226.1 |
| 2007/0120008 A1* | 5/2007 | Conner | F02C 7/04 244/53 B |
| 2009/0253361 A1* | 10/2009 | Porte | B64D 33/08 454/73 |
| 2010/0028139 A1* | 2/2010 | Bulin | F02C 7/18 415/178 |
| 2011/0179767 A1 | 7/2011 | Rinjonneau et al. | |
| 2014/0369812 A1* | 12/2014 | Caruel | F02K 3/06 415/116 |
| 2015/0274307 A1 | 10/2015 | Mercier et al. | |
| 2015/0377132 A1* | 12/2015 | Caruel | F01D 25/12 415/116 |
| 2016/0017751 A1* | 1/2016 | Caruel | F02C 7/047 415/175 |
| 2017/0002746 A1 | 1/2017 | Sawyers-Abbott et al. | |

* cited by examiner

ENGINE NACELLE HEAT EXCHANGER

TECHNICAL FIELD

This disclosure relates in general to engine nacelles, and more particularly to engine nacelles with one or more heat exchangers.

BACKGROUND

Aircraft may generate heat through operation of on-board systems, such as its engines, communications systems, or electronics control systems. As aircraft are modernized, the amount of heat generated by the aircraft may increase. This increased heat load may require additional heat dissipation to maintain the aircraft within operating range.

SUMMARY OF THE DISCLOSURE

According to one embodiment, a nacelle for an engine includes an exterior housing at least partially surrounding the engine. The nacelle further includes a front portion proximate an engine face of the engine. The front portion of the nacelle defines an opening into an interior of the nacelle. The nacelle further includes a seal disposed proximate the opening. The seal is configured to selectively allow air into the interior of the nacelle. The nacelle further includes a heat exchanger disposed within the interior of the nacelle. The heat exchanger is configured to exchange heat between a fluid flowing within the heat exchanger and air at the interior of the nacelle.

In particular embodiments, the heat exchanger is configured to flow the fluid away from the interior of the nacelle and the fluid is used to remove heat from a system remote from the nacelle.

In particular embodiments, the heat exchanger includes one or more valves, the one or more valves configured to discharge the fluid into the interior of the nacelle.

In particular embodiments, the exterior housing has a substantially round or elliptical cross-section and the opening extends around a perimeter defined at the front portion of the nacelle.

In particular embodiments, the heat exchanger extends in an arc around the engine disposed within the nacelle proximate the engine face of the engine.

In particular embodiments, the nacelle further includes one or more fans, the one or more fans configured to flow air from outside the nacelle across the heat exchanger. In some embodiments, the one or more fans are configured to control the rate of flow of air from outside the nacelle based at least partially on a velocity of the nacelle. In some embodiments, the one or more fans are configured to control the rate of flow of air from outside the nacelle based at least partially on a temperature of the fluid at the heat exchanger.

In particular embodiments, the seal includes a J-Seal and a K-Seal.

In particular embodiments, the seal includes a mechanical portion configured to move in response to an input to selectively allow air into the interior of the nacelle.

In particular embodiments, the seal allows air into the interior of the nacelle automatically when exposed to a pressure differential between air outside the nacelle at the opening and air within the interior of the nacelle above a threshold pressure differential.

According to another embodiment, a method includes providing a heat exchanger within an interior of a nacelle. The method further includes providing a seal around an opening of the nacelle. The seal is configured to selectively allow air into the interior of the nacelle. The method further includes opening the seal to allow air to flow from outside the nacelle into the interior of the nacelle through the opening. The method further includes exchanging heat between a fluid flowing within the heat exchanger and the air flowed into the interior of the nacelle at the heat exchanger. The method further includes closing the seal to prevent air to flow from outside the nacelle into the interior of the nacelle through the opening.

In particular embodiments, the method further includes flowing the fluid from the heat exchanger. The method further includes exchanging heat with a system remote from the nacelle using the fluid.

In particular embodiments, the method further includes discharging the fluid from the heat exchanger into the interior of the nacelle.

In particular embodiments, the method further includes determining the presence of a fire within the nacelle. The method further includes opening one or more valves of the heat exchanger. The fluid is a flame-retardant or flame-resistant fluid.

In particular embodiments, the method further includes flowing air into the interior of the nacelle through a second opening using one or more fans when the seal is closed.

In particular embodiments, opening the seal includes automatically opening the seal in response to exposure to a pressure differential between air outside the nacelle at the opening and air within the interior of the nacelle above a threshold pressure differential.

In particular embodiments, opening the seal includes mechanically moving a portion of the seal to selectively allow air into the interior of the nacelle.

In particular embodiments, opening the seal includes measuring a temperature of the fluid. Opening the seal further includes, in response to measuring a temperature above a threshold temperature, causing the seal to open to allow air into the interior of the nacelle.

According to yet another embodiment, an aircraft, includes, an engine, a nacelle housing the engine, an inlet duct, and a subsystem remote from the nacelle. The nacelle includes an exterior housing at least partially surrounding the engine. The nacelle further includes a front portion proximate an engine face of the engine. The front portion of the nacelle defines an opening into an interior of the nacelle. The nacelle further includes a seal disposed proximate the opening. The seal is configured to selectively allow air into the interior of the nacelle. The nacelle further includes a heat exchanger disposed within the interior of the nacelle. The heat exchanger is configured to exchange heat between a fluid flowing within the heat exchanger and air at the interior of the nacelle. The inlet duct is configured to direct air to the engine face of the engine. The fluid from the heat exchanger is configured to exchange heat generated at the subsystem.

The present disclosure may provide numerous advantages. For example, certain embodiments include a heat exchanger disposed within the nacelle to exchange heat with air ventilating the nacelle. Using the air at the front of the nacelle does not introduce any additional drag and may reduce inlet spillage thereby reducing drag from a baseline. Additionally, this concept may provide ram air while not altering the radar signature of the aircraft. As another example, certain embodiments include a seal around an opening of the nacelle that selectively allows air into the nacelle. By selectively allowing air within the nacelle, the heat exchange between the heat exchanger and the ventilating air may be controlled. As yet another example, in certain embodiments, the heat exchanger may controllably release a fluid into the interior of the nacelle. The heat exchanger may have one or more valves or openings that can be controlled to release a fire-retardant or fire-resistant fluid. This may be used to address flames or a fire within the nacelle, such as at the engine housed within the nacelle.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1A:
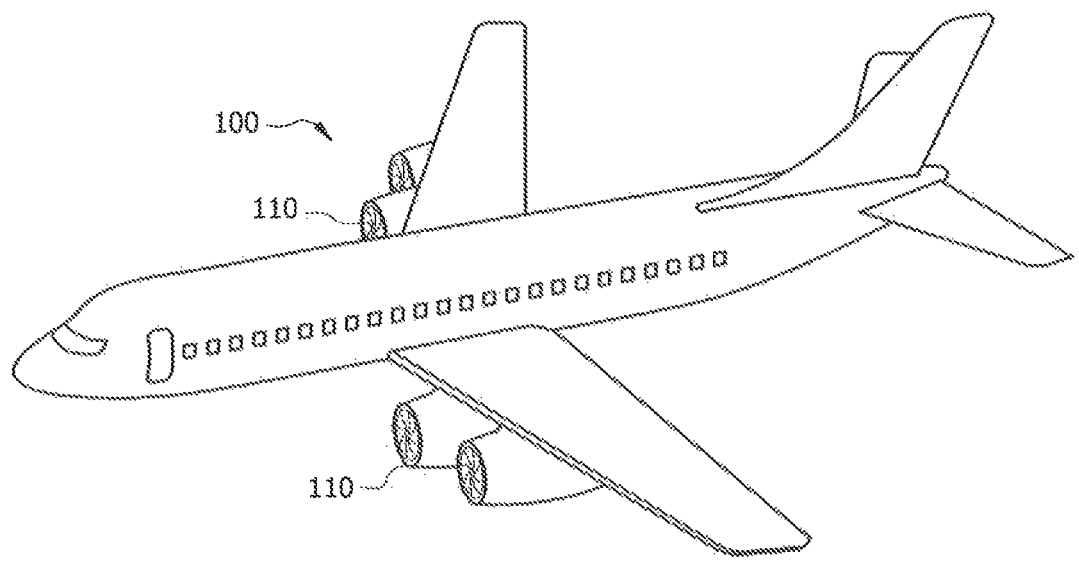
FIG. 1a illustrates an example commercial aircraft with podded engines including one or more nacelles, according to certain embodiments.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 6, where like numbers are used to indicate like and corresponding parts.

Heat dissipation for aircraft presents a growing problem, as more systems in the aircraft are generating larger amounts of heat. For example, more sophisticated electrical, communications, or control systems require additional heat dissipation, and in some cases, require active cooling. Conventional techniques to enhance heat dissipation within an aircraft have required the use of external scoops or structures to capture ram air. The external scoops may direct the air into the aircraft and through a heat exchanger. The use of these external structures to capture the ram air induces significant additional drag and may negatively alter the radar signature of the aircraft.

Accordingly, this disclosure contemplates removing heat from one or more systems in an aircraft by selectively introducing air flowing at a front of an engine nacelle to a heat exchanger in the nacelle. For example, aspects of the present disclosure include a nacelle that includes an exterior housing at least partially surrounding the engine. The apparatus may further include a front portion proximate an engine face of the engine. The front portion of the nacelle defines an opening into an interior of the nacelle. The apparatus may further include a seal disposed proximate the opening. The seal selectively allows air into the interior of the nacelle. The apparatus further includes a heat exchanger disposed within the interior of the nacelle. The heat exchanger exchanges heat between a fluid flowing within the heat exchanger and air at the interior of the nacelle.

The present disclosure may provide numerous advantages. For example, certain embodiments include a heat exchanger disposed within the nacelle to exchange heat with air ventilating the nacelle. Using the air at the front of the nacelle does not introduce any additional drag and does not alter the radar signature of the aircraft. As another example, certain embodiments include a seal around an opening of the nacelle that selectively allows air into the nacelle. By selectively allowing air within the nacelle, the heat exchange between the heat exchanger and the ventilating air may be controlled. As yet another example, in certain embodiments, the heat exchanger may controllably release a fluid into the interior of the nacelle. The heat exchanger may have one or more valves or openings that can be controlled to release a fire-retardant or fire-resistant fluid. This may be used to address flames or a fire within the nacelle, such as at the engine housed within the nacelle.

Other technical advantages will be readily apparent to one skilled in the art from the following figures, descriptions, and claims. Moreover, while specific advantages have been enumerated above, various embodiments may include all, some, or none of the enumerated advantages.

Figure 3A:
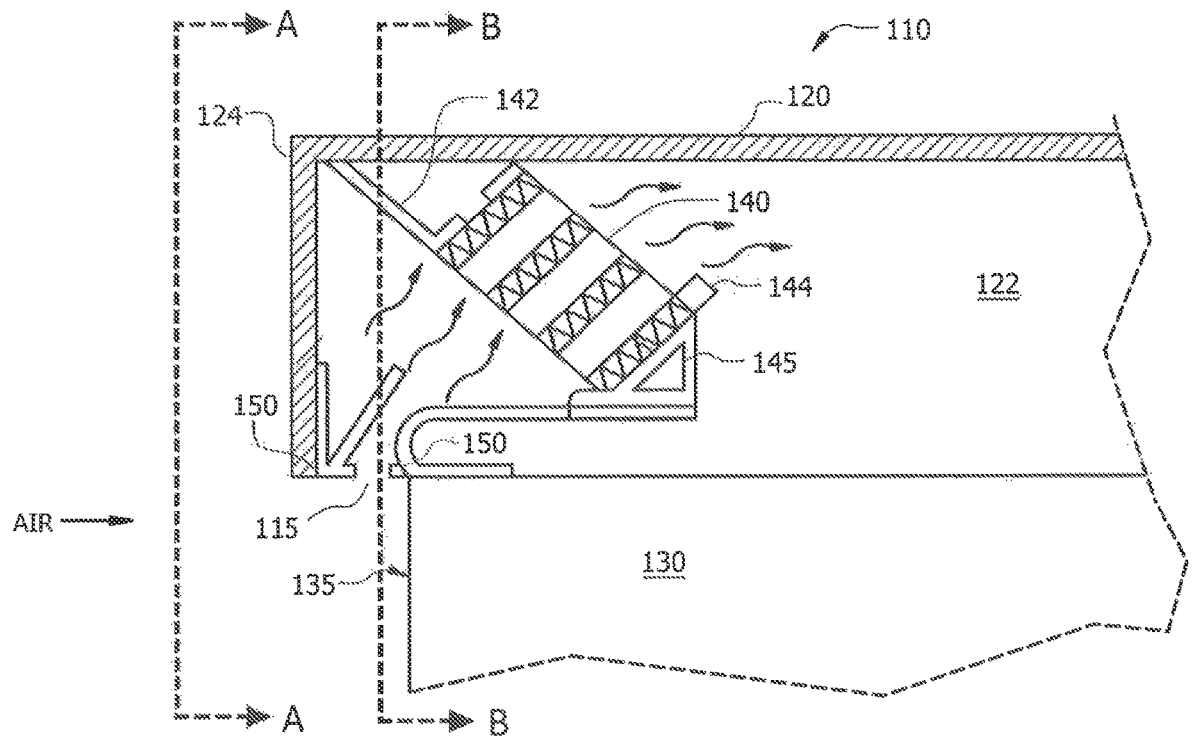
FIGS. 3a and 3b are a cross-section side views of the one or more examples of nacelles of FIG. 2a or FIG. 2b including a heat exchanger, according to certain embodiments.
Figure 3B:
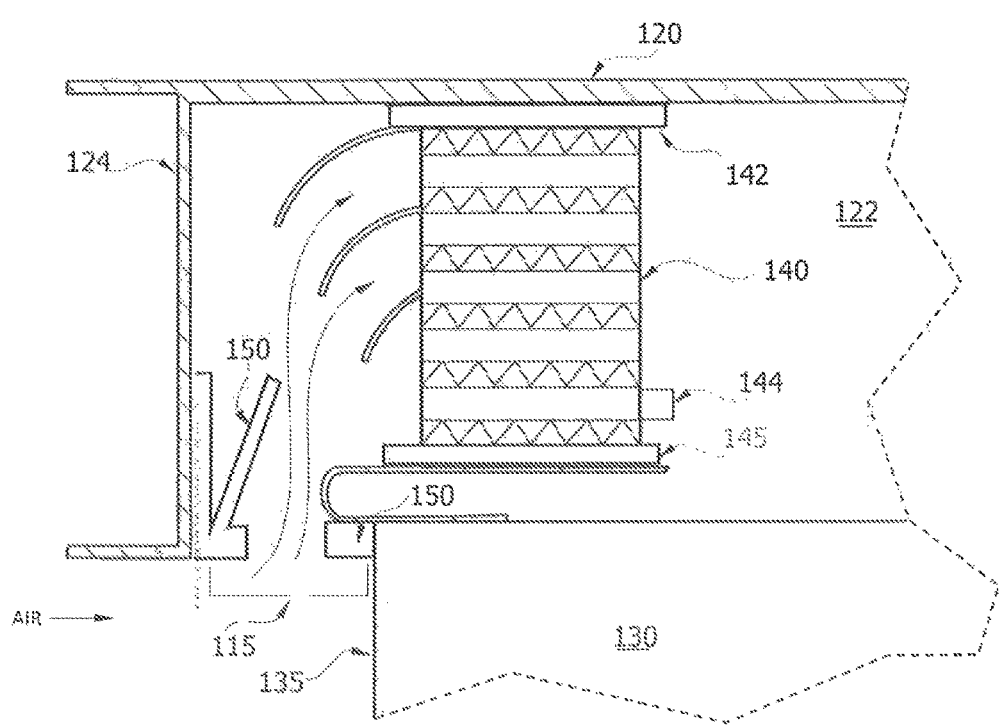
Figure 4:
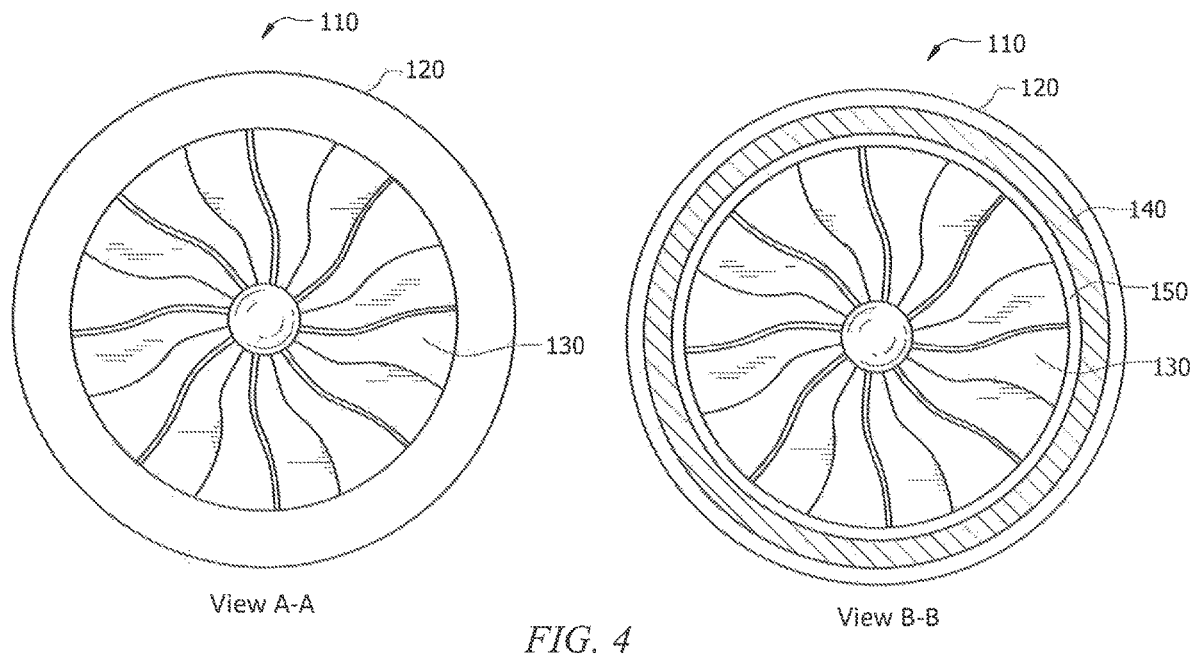
FIG. 4 is a cross-section front view of the example nacelle of FIG. 2 including a heat exchanger, according to certain embodiments.
Figure 5:
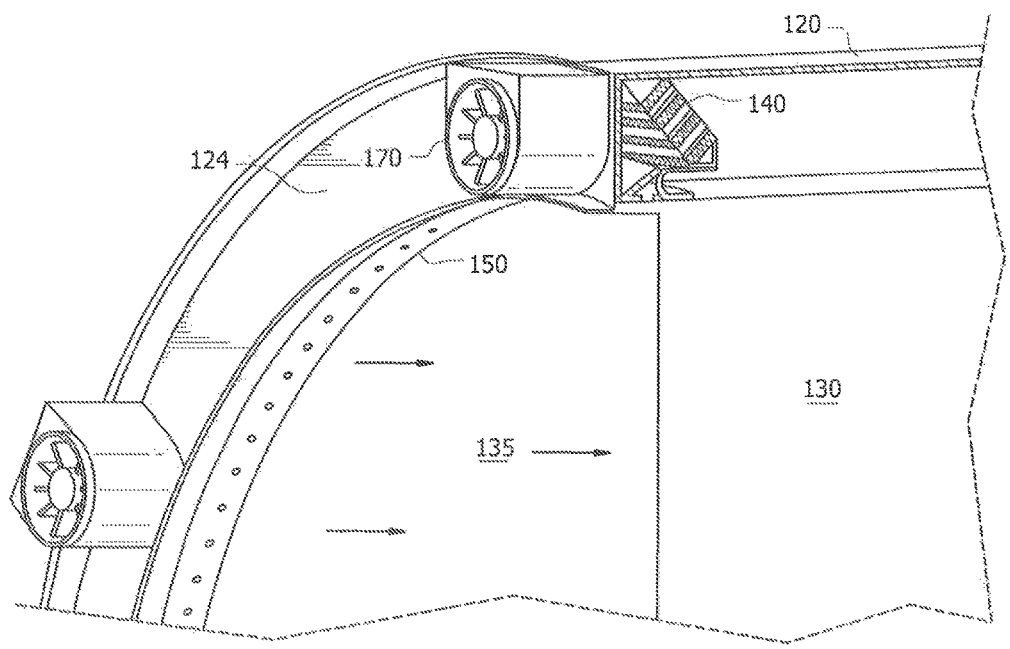
FIG. 5 is a cross-section isometric view of the example nacelle of FIG. 2 including one or more exterior fans, according to certain embodiments.
Figure 6:
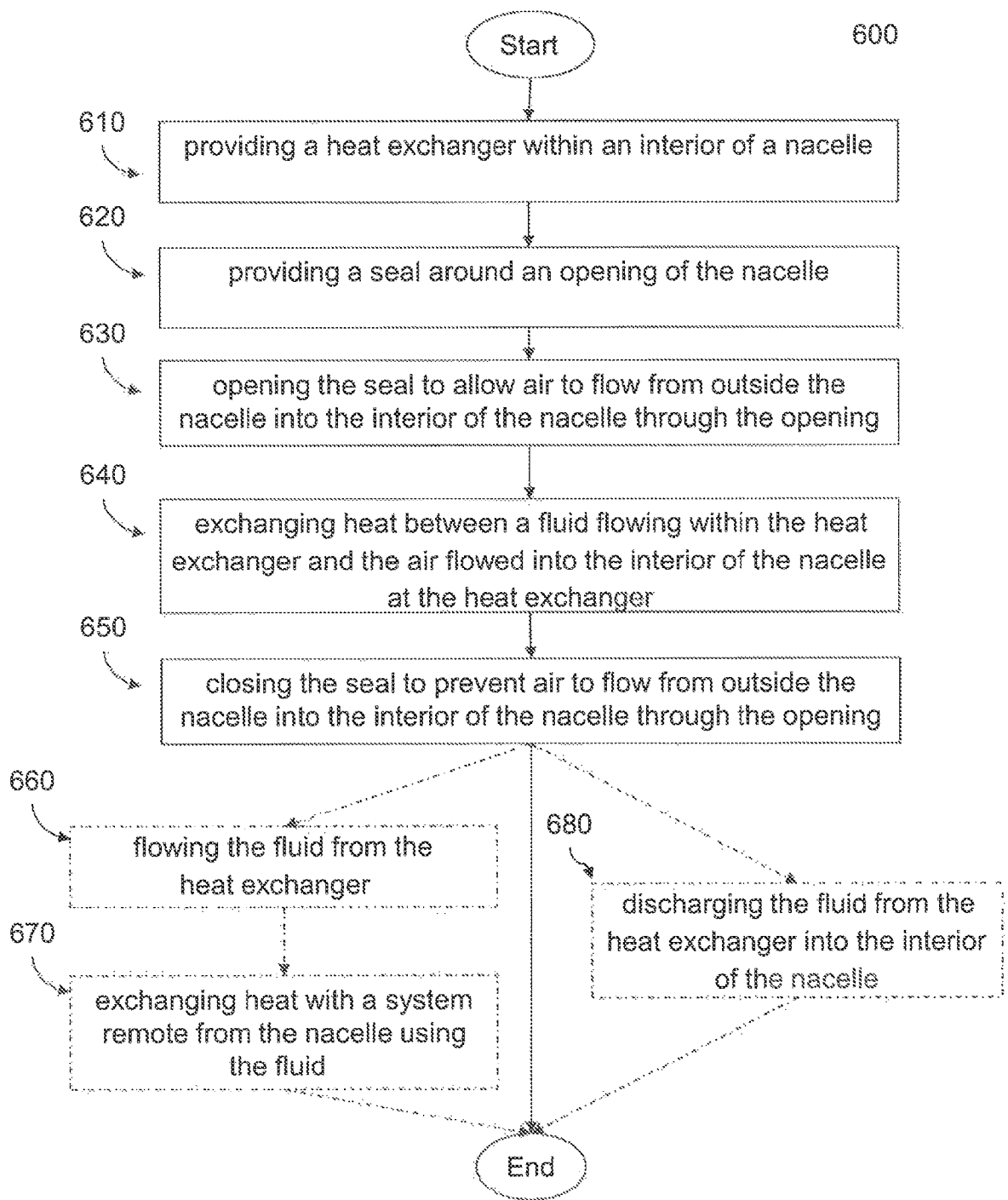
FIG. 6 is a flow chart diagram illustrating an example method of exchanging heat inside a nacelle housing an engine using ram air, according to certain embodiments.

Additional details are discussed in FIGS. 1 through 6. FIG. 1a illustrates an example aircraft including one or more nacelles featuring podded engines and FIG. 1b illustrates an example aircraft including one or more nacelles featuring an embedded engine within the airframe. FIG. 2a illustrates an example nacelle disposed over a podded engine and FIG. 2b illustrates an example nacelle disposed over an embedded engine. FIGS. 3 and 4 illustrate two views of the example nacelle of FIG. 2 including a heat exchanger. FIG. 5 illustrates the example nacelle of FIG. 2 including one or more exterior fans. FIG. 6 is a flow chart diagram illustrating an example method of exchanging heat inside a nacelle housing an engine using ram air.

FIG. 1a illustrates an example aircraft 100 including one or more nacelles 110, according to certain embodiments. Aircraft 100 may include one or more nacelles 110. For example, aircraft 100 may include one or more nacelles 110 that each house an engine. As in the illustrated example, aircraft may include a nacelle 110 over each of its engines disposed on its wings.

In certain embodiments, nacelle 110 leaves exposed a front portion of the engine. The exposed front portion may serve as an intake for the engine. The engine may use air flowing through its intake to control the combustion in the engine, passively cool the engine, and/or ventilate the engine and surrounding environment. In some embodiments, the amount of air flowing towards the engine exceeds the engines intake capacity. In such cases, the excess air flow may spill over and flow over the outside of nacelle 110, thereby causing drag to aircraft 100.

While aircraft 100 is depicted as an airplane, any suitable aircraft moving through the air is contemplated herein.

Figure 1B:
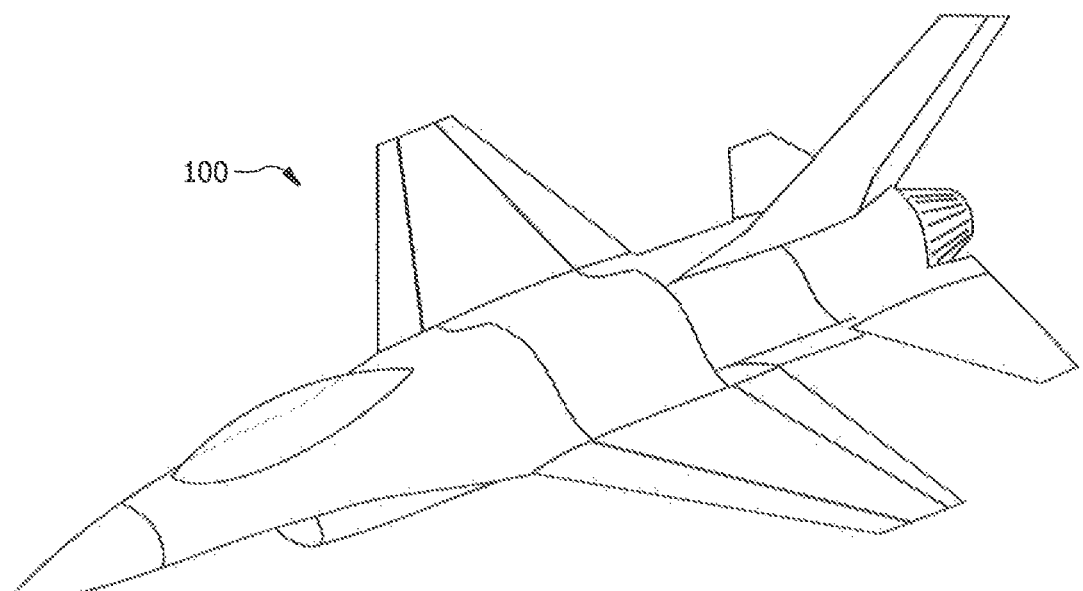
FIG. 1b illustrates an example military style aircraft with an embedded engine including one or more nacelles, according to certain embodiments.

FIG. 1b illustrates an example military style aircraft 100 with an embedded engine including one or more nacelles 110. In contrast with aircraft 100 depicted in FIG. 1a, aircraft 100 in FIG. 1b may include an embedded engine instead of podded engines within one or more nacelles 110. In certain embodiments, aircraft 100 may include only one nacelle 110. For example, an engine may be disposed along the length of aircraft 100 at least partially inside the interior of aircraft 100. At least certain embodiments disclosed herein may be applied to any style of aircraft 100, including commercial aircraft with podded engines and military style aircraft with an embedded engine.

Figure 2A:
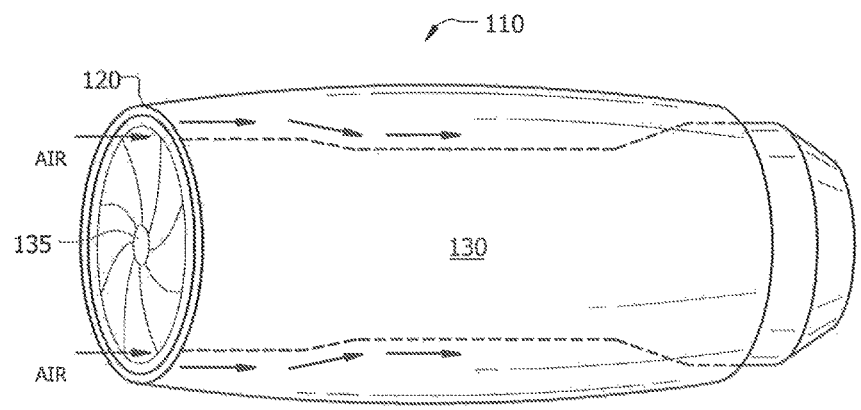
FIG. 2a illustrates an example nacelle disposed over a podded engine, according to certain embodiments.
Figure 2B:
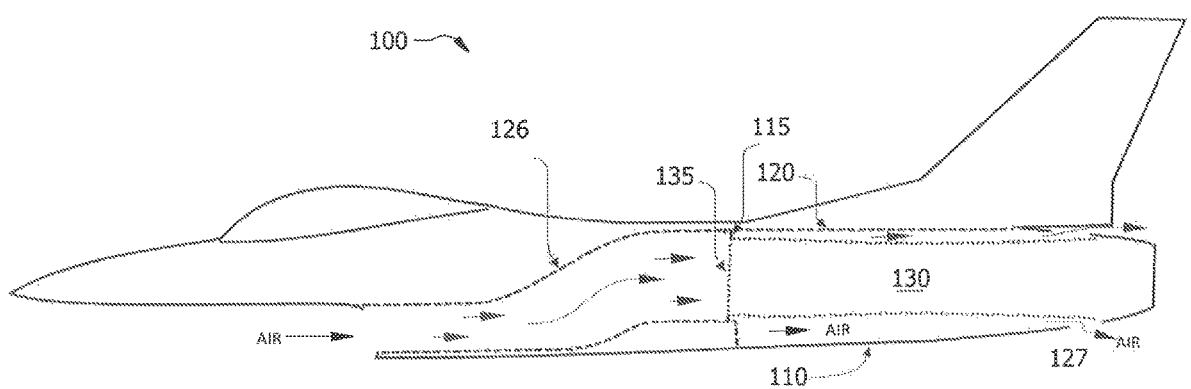
FIG. 2b illustrates an example nacelle disposed over an engine embedded within an aircraft, according to certain embodiments.

FIG. 2a depicts one of nacelles 110 disposed over an engine 130, according to certain embodiments. Nacelle 110 may be disposed over at least a portion of the length of engine 130. In certain embodiments, Engine 130 may be any suitable combustion engine. For example, engine 130 may be a jet propulsion engine or any other airbreathing engine, e.g., an embedded engine disposed in aircraft 100 as shown in FIG. 2b.

Engine 130 may include a front face 135. In general, engine 130 intakes air through front face 135 and uses the air during its combustion reaction to produce thrust. In certain embodiments, thrust may be generated by accelerating a jet of fluid in the direction opposite front face 135.

Air incident front face 135 of engine 130 may exceed the desired flow rate of air for engine 130. The incident air may flow radially away from the center of engine 130 and over the length of nacelle 110. In certain embodiments, nacelle 110 may not be completely closed around engine 130 such that some of the incident air may flow into the space between engine and nacelle 110. For example, the excess air may ventilate the environment around engine 130 within nacelle 110. This ventilation may remove volatiles or any undesired matter away from engine 130 and aircraft 100.

In certain embodiments, the front of nacelle 110 may extend over front face 135 of engine 130. These configurations may allow excess air to be captured within nacelle 110 for ventilation and any other use within nacelle 110. For example, nacelle 110 may have an opening proximate the perimeter of engine 130 that allows air within nacelle 110.

FIG. 2b illustrates an example nacelle 110 disposed over engine 130 embedded within an aircraft, such as military style aircraft 100 shown in FIG. 1b, according to certain embodiments. In certain embodiments, nacelle 110 is embedded within aircraft 100 over engine 130. For example, the ventilating and cooling air may flow within nacelle 110 around engine 130. In certain embodiments, aircraft 100 includes duct 126 that is configured to direct air from outside aircraft 100 to front face 135 of engine 130. Nacelle 110 may include a gap 115 at the intersection of nacelle 110 and duct 126 to allow airflow into nacelle 110 around engine 130. In certain embodiments, nacelle 110 may further include exit 127 for air flowing through nacelle 110 to exit nacelle 110. For example, air may flow through duct 126 into engine 130 and an interior of nacelle 110 through gap 115 and then exit nacelle 110 through exit 127. In this manner, air may flow through nacelle 110 around engine 130 embedded in aircraft 100.

FIG. 3a is a cross-section side view of nacelle 110, according to certain embodiments. Nacelle 110 may include exterior housing 120 that forms the outside of nacelle 110. For example, exterior housing 120 may include a bulkhead portion 124 proximate the front face 135 of engine 130. Exterior housing 120 may surround engine 130. In certain embodiments exterior housing 120 of nacelle 110 may only partially surround engine 130. For example, there may be one or more gaps, such as gap 115, between nacelle 110 and engine 130. Spaces between nacelle 110 and engine 130 may provide a via for air to flow within interior 122 of nacelle. In some embodiments, gap 115 is defined between nacelle 110 and engine 130 proximate front face 135 of engine 130, such as that depicted in the illustrated embodiment. In such cases, air may be incident on front face 135 of engine 130 and part of the air flow may flow through gap 115 into interior 122 of nacelle 110, as indicated by the illustrated arrows.

In certain embodiments, a seal 150 may be disposed over gap 115 between nacelle 110 and engine 130. Seal 150 may be configured to selectively open and/or close. In certain embodiments, seal 150 may be configured to be closed, to open completely, or open partially along from 0% open to 100% open. Whether seal 150 is opened or closed may control the flow of air into interior 122 of nacelle 110. For example, if seal 150 is closed, no air may flow within interior 120 of nacelle 110. As another example, if seal 150 is open, then air my flow into interior 120 of nacelle 110. As yet another example, if seal 150 is only partially open, air may still flow into interior 122 of nacelle 120, but at a lesser flow rate than if seal 150 was completely open. In this manner, seal 150 may selectively control the air flow within nacelle 110.

Seal 150 may selectively allow air into interior 122 of nacelle 110 through any suitable means. In certain embodiments, seal 150 may automatically allow air flow into interior 122 of nacelle 110 based on one or more conditions at nacelle 110 and/or engine 130. In some embodiments, seal 150 may automatically allow air flow through gap 115 when the pressure differential between the air incident front face 135 outside nacelle 110 and the air in interior 122 of nacelle 110 is greater than a predetermined threshold. For example, the pressure differential may be generated based on the speed of aircraft 100 and above a certain speed, seal 150 may open to allow air flow within interior 122 of nacelle 110. In some embodiments, seal 150 may selectively allow airflow based on the heat dissipation requirements of aircraft 100. For example, if additional heat is generated at engine 130 or at a remote system, seal 150 may be opened to allow air to flow within interior 122 of nacelle 110 to provide additional heat dissipation. In this manner, seal 150 may selectively open to allow air flow based on many circumstances.

Seal 150 may be any seal, closure, or blocking mechanism that may selectively allow and/or prevent airflow through gap 115 between nacelle 110 and engine 130. In certain embodiments, seal 150 may include a pair of seals that operate together to selectively open or close gap 115 between nacelle 110 and engine 130. For example, seal 150 may comprise a J-seal and a K-seal. As shown in the illustrated embodiment, a K-seal may be coupled to bulkhead 124 and a J-seal may be coupled to engine 130. The K-seal may include a flap that may move to open seal 150 by moving the flap towards bulkhead 124 and may move to close seal 150 by resting against a portion of the J-seal. In some embodiments, the K-seal may automatically open or close based on the pressure differential between the pressure outside nacelle 110 proximate front face 135 and the pressure inside interior 122 of nacelle 110. In some embodiments, the pressure differential may result from aircraft 100 achieving a threshold speed during operation. In this manner, seal 150 may selectively open during operation of aircraft 100 when it may most need heat dissipation facilitated by ambient air.

In certain embodiments, seal 150 may include a mechanical seal. For example, seal 150 may include one or more mechanical parts that are controlled through a mechanism to selectively open and close seal 150 by moving one or more of the mechanical parts. In some embodiments, the controlling mechanism may include any electrical control means, such as actuators, solenoids, switches, motors, etc. or hydraulic control means, or any combination thereof. The controlling mechanism may be automatically activated to selectively open and/or close seal 150. For example, the controlling mechanism may selectively open and/or close seal 150 in response to one or more environmental conditions proximate seal 150 or in response to one or more measured conditions of engine 130 or heat dissipation needs at a remote system of aircraft 100. In some embodiments, the control mechanism may be operated manually, alternatively or in addition to being automatically controlled, to selectively introduce air into interior 122 of nacelle 110.

Nacelle 110 further include heat exchanger 140. Heat exchanger 140 may be disposed within interior 122 of nacelle 110. Heat exchanger 140 may facilitate the exchange and/or transfer of heat to or from the environment of interior 122 of nacelle 110. For example, heat exchanger 140 may facilitate the transfer of heat from heat exchanger 140 into air within interior 122 of nacelle 110. The air within interior 122 may be at a lower temperature than heat exchanger 140 and may passively transfer heat to the air within nacelle 110. In some embodiments, air may pass through a portion of heat exchanger 140. The flow of air may increase the amount of heat transferred by heat exchanger 140. For instance, seal 150 may be selectively opened to allow additional air from outside aircraft 100 to flow into interior 122 of nacelle 110 through heat exchanger 140. In this manner, seal 150 may control the capacity of heat transfer by heat exchanger 140.

Heat exchanger 140 may be mounted within interior 122 of nacelle 110 in any suitable manner to allow air to flow across a portion of heat exchanger 140. For example, heat exchanger 140 may be coupled to one or more of exterior housing 120 and/or engine 130 through mounts 142 and/or 145, respectively. In some embodiments, heat exchanger 140 is coupled to both exterior housing 120 and engine 130. For example, heat exchanger 140 may be mounted directly to exterior housing 120 by mount 142 and coupled via a portion of seal 150 to engine 130 using mount 145. In this manner, heat exchanger 140 may be secured within nacelle 110.

Heat exchanger 140 may be any suitable heat exchanging apparatus that is capable of exchanging heat to a fluid, such as air. In certain embodiments, heat exchanger may include an intermediary heat exchanging medium to move heat from a remote system on aircraft 100 to heat exchanger 140 inside nacelle 110. For example, the heat exchanging medium may be flowed from heat exchanger 140 to another heat exchanging apparatus outside nacelle 110. For example, heat from control systems, communications systems, and/or electronics systems may require additional heat dissipation. Accordingly, one or more of the remote systems may transfer heat to the heat exchanging medium, which may be used to transport the transferred heat to heat exchanger 140. At heat exchanger 140, the transported heat may be transferred to the air inside interior 122 of nacelle 110. In this manner, the air selectively introduced into nacelle 110 may be used to dissipate heat, even if the heat is not generated at engine 130 or within nacelle 110.

In certain embodiments, the heat exchanging medium is a fluid flowing through heat exchanger 140 to facilitate the transfer of heat. Heat exchanger 140 may allow for the transfer of heat to and from the fluid and environment at interior 122 of nacelle 110. The fluid may be any suitable heat-exchanging fluid. For example, the fluid may be a Chlorofluorocarbon (CFC), a Hydrochlorofluorocarbon (HCFC), a Hydrofluorocarbon (HFC), a Fluorocarbon (FC), a Hydrocarbon (HC), Ammonia, Carbon Dioxide, a water, a polyalphaolefin (PAO), or a water-glycol mixture. In certain embodiments, the fluid used in heat exchanger 140 may have fire-extinguishing or fire-retardant capabilities.

In certain embodiments, nacelle 110 may selectively allow air within interior 122 based on the temperature of the fluid within heat exchanger 140. For example, nacelle 110 and/or aircraft 100 may include one or more sensors with which to detect and measure the temperature of the fluid within heat exchanger 140. In response to measuring a temperature above a threshold temperature, seal 150 may be caused to open to allow air into interior 122 of nacelle 110. As a result, air may be selectively introduced into interior 122 when there is a unmet heat dissipation need, e.g., as indicated by the temperature of the fluid within heat exchanger 140. Other sensors and/or measurements may be used to control the flow of air within interior 122 of nacelle 110. For example, one or more temperature or pressure sensors of the fluid within heat exchanger 140 or at remote locations in aircraft 100 may be used to determine whether heat dissipation using heat exchanger 140 is needed at an increased level. As another example, an anticipated heat load may be determined based on the operation of aircraft 100, which may be used to control seal 150 to allow air within nacelle 110.

Heat exchanger 140 may include one or more valves 144 inside interior 122 of nacelle 110. Valves 144 may be controllable to open or close, either automatically or manually. When valves 144 are open, heat exchanger 140 may be configured to eject the fluid used to transfer heat into interior 122 of nacelle. For example, the fluid may be under a pressure within heat exchanger 140. When valves 144 are open, the resulting pressure differential may cause the fluid to flow out of heat exchanger 140 through valves 144 and into interior 122 of nacelle 110. In embodiments where the fluid has fire extinguishing or fire-retardant properties, the fluid may be ejected into interior 122 of nacelle 110 in the event of a fire within nacelle 110. For example, valves 144 may be opened in response to detecting a fire at engine 130. The fire retardant/extinguishing fluid may extinguish or help extinguish the detected fire and reduce the damage caused by the fire. For example, the fluid may be used in addition to existing techniques for extinguishing a fire at engine 130. Because heat exchanger 140 flows the fluid inside nacelle 110, it may be best positioned to deliver an extinguishing fluid to engine 130 or anywhere within nacelle 110. In this manner, heat exchanger 140 may also serve as a fire suppression system.

FIG. 3b is another cross-section side view of nacelle 110, according to certain embodiments. In certain embodiments, heat exchanger 140 may be position within interior 122 and/or nacelle 110 with a variety of orientations. For example, FIG. 3a illustrates heat exchanger 140 tilted relative to the length of nacelle. In contrast, FIG. 3b illustrates heat exchanger 140 perpendicular to the flow of air through interior 122 of nacelle 110. Each orientation may have certain advantages and disadvantages. For example, the orientation in FIG. 3a may allow a larger heat exchanger 140 to fit within nacelle 110 but may require additional and/or more complex support to position within nacelle 110. As another example, the orientation in FIG. 3b may simplify the coupling of heat exchanger 140 to nacelle 110 but may use additional components to direct airflow across heat exchanger 140, as depicted in FIG. 3b. While certain orientations of heat exchanger 140 have been described above, the disclosure herein contemplates any number of different orientations and configurations of heat exchanger 140 within nacelle 110, not limited to the illustrative examples described above.

FIG. 4 is a cross-section front view of nacelle 110, according to certain embodiments. Views A-A and B-B are cross-sections at two points along the length of nacelle 110 depicted in FIG. 3a. In certain embodiments, heat exchanger 140 may be disposed around the perimeter of engine 130 inside nacelle 110. In some embodiments, heat exchanger 140 may be in the shape of an annulus around engine 130. For example, the cross-section of heat exchanger 140 may be a circular or elliptical annulus. In some embodiments, heat exchanger 140 does not completely encircle engine 130 within nacelle 110. For example, heat exchanger 140 may generally be annular but have one or more cut-out sections such that heat exchanger 140 is disposed only partially around engine 130. The cut-out sections may be provided to make room for other elements within nacelle 110 or for mounting heat exchanger 140.

FIG. 5 is a cross-section isometric view of nacelle 110 including one or more fans 170, according to certain embodiments. In certain embodiments, the air flow within interior 122 of nacelle 110 may be supplemented by air through one or more fans 170. For example, fans 170 may generate an additional flow of air from outside nacelle 110 into interior 122 of nacelle 110 across heat exchanger 140. In certain embodiments, one or more fans 170 are mounted to bulkhead 124 of nacelle. Fans 170 may be spaced around the perimeter of nacelle 110 to provide even flow across heat exchanger 140 when fans 170 flow air into nacelle 110.

In certain embodiments, fans 170 may be controllable. For example, fans 170 may be controlled automatically or manually to control the airflow generated by fans 170. Fans 170 may be controlled based on circumstances such as the speed of aircraft 170, the desired heat dissipation, the pressure of fluid within heat exchanger 140, and the environmental conditions within interior 122 of nacelle 110, amongst others. As an example, if seal 150 only allows air into interior 122 of nacelle 110 when a certain threshold pressure differential is exceeded, then no air is allowed to flow through seal 150 when the pressure differential is below that threshold. This may occur when aircraft 100 is stationary or taxiing. Despite the lower speeds, aircraft 100 may still generate sufficient heat that requires the heat dissipation capabilities of heat exchanger 140. In such cases, fans 170 may be controlled to provide sufficient airflow for the current heat dissipation needs of aircraft 100. In some embodiments, even if seal 150 is open or partially open, fans 170 may be controlled to provide additional airflow within interior 122 of nacelle 110.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

FIG. 6 is a flow chart diagram illustrating an example method 600 of exchanging heat inside a nacelle housing an engine using ram air. Method 600 may begin at step 610. At step 610, a heat exchanger may be provided within an interior of a nacelle. For example, the nacelle may be disposed over an engine, such as nacelle 110 over engine 130 and the heat exchanger may be disposed in the space between the nacelle and the engine.

At step 620, a seal may be provided around an opening of the nacelle. The seal may be configured to selectively allow air into the interior of the nacelle. For example, a combination of a J-seal and a K-seal may be provided near the opening. The J and K seals may allow air in selectively based on the pressure differential between the pressure inside an interior of the nacelle and outside the nacelle proximate the opening. Any suitable seal, such as the various embodiments of seal 150 discussed above, may be provided in step 620.

After the seal is provided, method 600 may move to step 630. At step 630, the seal may be opened to allow air to flow from outside the nacelle into the interior of the nacelle through the opening. In this manner, air may be selectively introduced into the nacelle.

At step 640, heat is exchanged between a fluid flowing within the heat exchanger and the air flowed into the interior of the nacelle at the heat exchanger. For example, air may pass through a portion of the heat exchanger and exchange heat via conduction or convection with the heat exchanger and fluid flowing inside the heat exchanger.

At step 650, the seal may be closed to prevent air to flow from outside the nacelle into the interior of the nacelle through the opening. The seal may be closed in response to a variety of circumstances, as described above in reference to seal 150. Method 600 may end at step 650.

In certain embodiments, method 600 includes optional steps 660 and 670. At step 660, fluid may be flowed from the heat exchanger. For example, the fluid that has transferred heat with the air within the nacelle may be flowed to another part of the aircraft. At step 670, heat may be exchanged with a system remote from the nacelle using the fluid. For example, fluid may be used to dissipate heat from systems remote from the nacelle and/or engine. In some cases, heat from control systems, communications systems, and/or electronics systems may be transferred to the fluid, which may be flowed to the heat exchanger at the nacelle. In this manner, the air selectively introduced into the nacelle may be used to dissipate heat, even if the heat is not generated at the engine or within the nacelle.

In certain embodiments, method 600 includes optional step 680. At step 680, the fluid is discharged from the heat exchanger into the interior of the nacelle. For example, a fire or flame may be sensed at the engine or within the nacelle. The fluid may have fire-retardant properties. Accordingly, the expulsion of the fluid inside the nacelle may reduce or eliminate the fire, thereby reducing damage to the aircraft and the safety hazard caused by the fire. In some embodiments, step 680 includes opening one or more valves of the heat exchanger that allows for the expulsion of the fluid. For example, the heat exchanger may include one or more controllable valves around its length that can be opened when it is determined that a fire is present within the nacelle.

Modifications, additions, or omissions may be made to method 600 depicted in FIG. 6. Any steps may be performed in parallel or in any suitable order. Furthermore, method 600 may include more, fewer, or other steps. Additionally, while various components of nacelle 110 were discussed in relation to the steps in method 600, the steps of method 600 may be taken using any suitable component or combination of components of system nacelle 110 or aircraft 100.

The present disclosure may provide numerous advantages. For example, certain embodiments include a heat exchanger disposed within the nacelle to exchange heat with air ventilating the nacelle. Using the air at the front of the nacelle does not introduce any additional drag, may reduce inlet spillage drag, and does not alter the radar signature of the aircraft. As another example, certain embodiments include a seal around an opening of the nacelle that selectively allows air into the nacelle. By selectively allowing air within the nacelle, the heat exchange between the heat exchanger and the ventilating air may be controlled. As yet another example, in certain embodiments, the heat exchanger may controllably release a fluid into the interior of the nacelle. The heat exchanger may have one or more valves or openings that can be controlled to release a fire-retardant or resistant fluid. This may be used to address flames or a fire within the nacelle, such as at the engine housed within the nacelle.

Other technical advantages will be readily apparent to one skilled in the art from the following figures, descriptions, and claims. Moreover, while specific advantages have been enumerated above, various embodiments may include all, some, or none of the enumerated advantages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A nacelle for an engine, comprising:
an exterior housing at least partially surrounding the engine;
a front portion proximate an engine face of the engine, wherein the front portion of the nacelle defines an opening into an interior of the nacelle;
a seal disposed proximate the opening, wherein the seal is configured to selectively allow air into the interior of the nacelle, the seal comprising a K-Seal positioned on the exterior housing of the nacelle and a J-Seal positioned on the engine, the K-Seal comprising a flap configured to rest against a portion of the J-Seal;
a heat exchanger disposed within the interior of the nacelle, the heat exchanger coupled to the J-Seal via a mount, the heat exchanger configured to exchange heat between a fluid flowing within the heat exchanger and the air at the interior of the nacelle; and
wherein the nacelle further comprises one or more fans, the one or more fans configured to flow the air from outside the nacelle across the heat exchanger.

2. The nacelle of claim 1, wherein the heat exchanger is configured to flow the fluid away from the interior of the nacelle and the fluid is used to remove heat from a system remote from the nacelle.

3. The nacelle of claim 1, wherein the heat exchanger comprises one or more valves, the one or more valves configured to discharge the fluid into the interior of the nacelle.

4. The nacelle of claim 1, wherein the exterior housing has a substantially round or elliptical cross-section and the opening extends around a perimeter defined at the front portion of the nacelle.

5. The nacelle of claim 1, wherein the heat exchanger extends in an arc around the engine disposed within the nacelle proximate the engine face of the engine.

6. The nacelle of claim 1, wherein the one or more fans are configured to control a rate of flow of the air from outside the nacelle based at least partially on a velocity of the nacelle.

7. The nacelle of claim 1, wherein the one or more fans are configured to control a rate of flow of the air from outside the nacelle based at least partially on a temperature of the fluid at the heat exchanger.

8. The nacelle of claim 1, wherein the seal comprises a mechanical portion configured to move in response to an input to selectively allow the air into the interior of the nacelle.

9. The nacelle of claim 1, wherein the seal allows the air into the interior of the nacelle automatically when exposed to a pressure differential between the air outside the nacelle at the opening and the air within the interior of the nacelle above a threshold pressure differential.

10. The nacelle of claim 1, wherein the one or more fans comprises at least two fans that are spaced around a perimeter of the nacelle.

11. An aircraft, comprising:
an engine;
a nacelle housing the engine, the nacelle comprising:
    an exterior housing at least partially surrounding the engine;
    a front portion proximate an engine face of the engine, wherein the front portion of the nacelle defines an opening into an interior of the nacelle;
    a seal disposed proximate the opening, wherein the seal is configured to selectively allow air into the interior of the nacelle, the seal comprising a K-Seal positioned on the exterior housing of the nacelle and a J-Seal positioned on the engine, the K-Seal comprising a flap configured to rest against a portion of the J-Seal; and
    a heat exchanger disposed within the interior of the nacelle, the heat exchanger coupled to the J-Seal via a mount, the heat exchanger configured to exchange heat between a fluid flowing within the heat exchanger and the air at the interior of the nacelle;
an inlet duct configured to direct the air to the engine face of the engine;
a subsystem remote from the nacelle, wherein the fluid from the heat exchanger is configured to exchange heat generated at the subsystem; and
wherein the nacelle further comprises one or more fans, the one or more fans configured to flow the air from outside the nacelle across the heat exchanger.

* * * * *